United States Patent [19]
Remington

[11] Patent Number: 5,605,658
[45] Date of Patent: Feb. 25, 1997

[54] LOCATING PROTRUSION ON EXTRUDED PART

[75] Inventor: Mark Remington, Strongsville, Ohio

[73] Assignee: The Standard Products Company, Cleveland, Ohio

[21] Appl. No.: 254,960

[22] Filed: Jun. 7, 1994

[51] Int. Cl.[6] .................................................. B29C 33/42
[52] U.S. Cl. ........................................................ 264/320
[58] Field of Search ............................................. 264/320

[56] References Cited

U.S. PATENT DOCUMENTS 4,377,549  3/1983  Taig ........................................ 264/320
4,631,104  12/1986  Jackson ............................ 264/320 X Primary Examiner—Leo B. Tentoni
Attorney, Agent, or Firm—Harness, Dickey & Pierce, P.L.C.

[57] ABSTRACT

A locating and fastening protrusion extending from a back surface of a vehicle trim strip or molding strip being integrally formed with thermoplastic material of the molding strip. The protrusion is formed by applying a hollow heated die cavity against the thermoplastic back surface of the molding strip. The heated die cavity causes the thermoplastic material to melt and as the die cavity is applied against the molding member, the melted thermoplastic material is forced into the die cavity. The die cavity is then cooled such that the material within the die cavity solidifies. The die cavity is removed such that an integral protrusion is left extending from the molding member.

5 Claims, 1 Drawing Sheet

LOCATING PROTRUSION ON EXTRUDED PART

BACKGROUND OF THE INVENTION

1. Field of the Invention

This invention relates generally to a method of forming a protrusion extending from a thermoplastic part and, more particularly, to a method of forming a locating and/or fastening stud integral with and extending from a back surface of a thermoplastic body trim strip or molding strip associated with a vehicle in which the locating protrusion is formed from the thermoplastic material of the strip.

2. Discussion of the Related Art

Vehicle body trim strips or molding strips that are flexible and have a thermoplastic base layer that includes a substantially planar back surface to be positioned against and fastened to a vehicle body part are well known in the art. Generally, these molding strips include a series of protruding members extending from the back surface of the strip which are inserted into associated openings extending through the vehicle body part so as to align the molding strip with the vehicle, and, in some cases, provide a mechanism for attaching the molding strip to the vehicle. For many years, various protruding members have been welded to the thermoplastic portions of these molding strips to perform locating and fastening functions. In some of these implementations, the protruding members are molded into the thermoplastic portions by an applicable die apparatus when the molding strip is formed.

U.S. Pat. No. 4,631,104 issued to Jackson, and assigned to the assignee of the instant application, discloses a thermoplastic vehicle trim strip or molding strip having a metal stud or mounting member secured to the strip in order to provide a mechanism for locating the strip relative to the vehicle. The mounting stud includes a base portion that is embedded in the thermoplastic material of the strip. Before the mounting stud is secured to the strip, the base portion is heated to a temperature sufficient to cause the base portion to melt the thermoplastic material of the trim strip. When appropriate pressure is applied to the mounting stud, the base portion of the stud will melt the thermoplastic material so as to become embedded in the trim strip and retained there once the thermoplastic material cools. Elongated adhesive strips positioned adjacent the mounting studs serve to secure the molding strip to the vehicle.

Although the above-described mounting stud for a vehicle trim or molding strip has been relatively effective, there still remains room for improvement of this procedure. Particularly, because the mounting stud is made of a metal, corrosion and oxidation of the stud may present a problem over time in that the mounting stud may break resulting in the molding hanging off and/or falling from the vehicle. Further, the cost of the fasteners and the tools required to manufacture these mounting studs are excessive in today's cost competitive environment. Additionally, use of a rigid metal part used in connection with the molding strip provides a level of risk of damaging the aesthetic face and related thermoplastic materials of the trim strip during packaging and transportation of the trim strips as a result of the metal part contacting adjacent trim strips. Also, the process of fastening metal studs to moldings is time consuming and difficult.

What is needed is a locating protrusion on a vehicle trim strip which at least attempts to alleviate the drawbacks mentioned above. It is therefore an object of the present invention to provide such a trim strip.

SUMMARY OF THE INVENTION

In accordance with the teaching of the present invention, a vehicle trim strip or body molding strip is disclosed which includes locating and/or fastening protrusions extending from a back surface of a thermoplastic base layer of the trim strip. The locating protrusions are formed from thermoplastic material already existent in the trim strip after the trim strip has been formed by an extrusion process. The protrusions are formed by a cylindrical protrusion cavity having an internal bore. The protrusion cavity is heated by an associated heating element, and then is applied against the back surface of the trim strip with sufficient pressure such that thermoplastic material in the trim strip is heated and melted thermoplastic material is forced into the internal bore of the protrusion cavity. The protrusion cavity is then cooled to a temperature that will allow the thermoplastic material to be solidified within the protrusion cavity. The protrusion cavity is then withdrawn such that the locating protrusion is formed integral with the trim strip.

Additional objects, advantages, and features of the present invention will become apparent from the following description and appended claims, taken in conjunction with the accompanying drawings.

DETAILED DESCRIPTION OF THE PREFERRED EMBODIMENT

The following discussion of the preferred embodiments concerning a vehicle trim strip or molding member including an integral protrusion, and the method of forming the protrusion, is merely exemplary in nature and is in no way intended to limit the invention or its applications or uses. Particularly, the method of forming the protrusion can be readily expanded to other fields which could take advantage of forming an integral protrusion with a base member.

Figure 1:
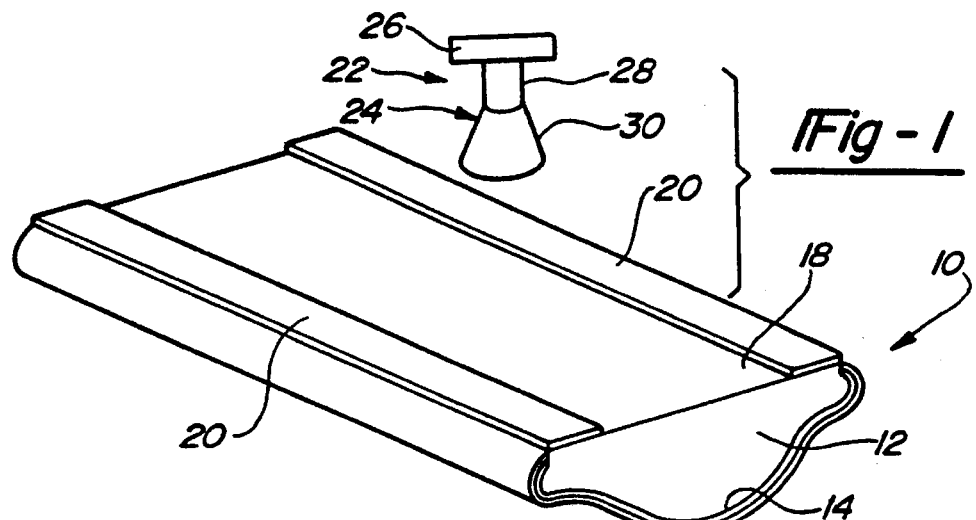
FIG. 1 is a perspective view of a vehicle body molding member and a protrusion cavity according to a preferred embodiment of the present invention.
Figure 2:
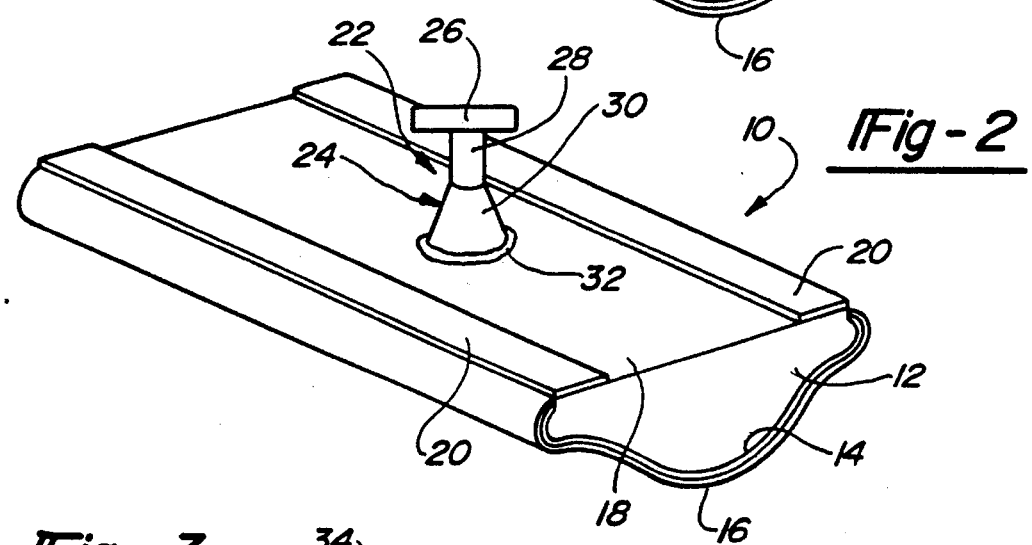
FIG. 2 is a perspective view of the protrusion cavity in contact with the molding member of FIG. 1.

With the above caveat in mind, first turn to FIGS. 1 and 2 where a perspective view of a flexible vehicle molding member 10, such as a vehicle trim strip, a body side molding or a bumper molding, is shown that has been designed and manufactured to be secured to an appropriate location on a vehicle (not shown). The molding member 10 has a series of layers which are laminated together by an extrusion process well understood by those skilled in the art. Particularly, the molding member 10 includes a thermoplastic base layer 12, a middle decorative layer 14, and an outer decorative, transparent, protective layer 16. The thermoplastic base layer 12 is preferably polyvinylchloride (PVC), the decorative layer 14 can be a metalized mylar layer and the outer layer 16 can be a bright strip layer, preferably made of mylar. Additionally, the base layer 12, as well as the decorative layers 14 and 16, are shaped into a decorative form to be aesthetically conforming with the vehicle. Layers of these types, formed by a co-extrusion process, are well understood in the art. However, as will become apparent from the discussion below, other types of molding strips having different layers can also be used without departing from the spirit of the invention.

The thermoplastic base layer 12 includes a substantially planar back surface 18 which will be mounted flush against the vehicle in order to expose the decorative outer layers 14 and 16 of the molding member 10. In order to secure the molding member 10 to the vehicle, strips of adhesive tape 20 are attached to the back surface 18 extending longitudinally along outer edges on opposite sides of the back surface 18. The adhesive strips 20 will secure the molding member 10 in place on the vehicle. However, protrusions are necessary to at least locate the molding member 10 to the desirable location on the vehicle prior to the molding member 10 being secured to the vehicle.

In order to form the locating protrusions, a locating and/or fastening protrusion device 22 is provided. The protrusion device 22 includes a die cavity 24 and a temperature controlled heater block 26. For reasons that will become apparent from the discussion below, the die cavity 24 is hollow and is made of a highly heat conductive metal, such as aluminum. The die cavity 24 includes an upper hollow cylindrical portion 28 and a lower hollow conical portion 30. The hollow portion of the die cavity 24 is accessible through an opening (not shown) in the widest part of the conical portion 30 at the bottom of the die cavity 24. The heater block 26 provides the heat necessary to heat the cavity 24. Different mechanisms (not shown) known in the art can be provided for heating and controlling the heater block 26.

The protrusion device 22 is shown in its home position in FIG. 1. In this position, the cavity will be heated to a temperature sufficient to readily melt the thermoplastic material of the base layer 12. Once the cavity 24 reaches this temperature, a mechanism (not shown) will cause the protrusion device 22 to travel towards the molding member 10 such that the cavity 24 is applied against the back surface 18 of the molding member 10 in a pressure engagement as shown in FIG. 2. The molding member 10 is secured within an appropriate fixture (not shown) such that the protrusion device 22 contacts the appropriate location on the molding member 10. The combination of heat and pressure from the die cavity 24 causes the thermoplastic material of the base layer 12 to melt. The die cavity 24 will travel into the thermoplastic base layer 12 a sufficient distance such that melted thermoplastic material from the base layer 12 is forced into the hollow portion of the die cavity 24. The mechanism for forcing the die cavity 24 into the base layer 12 can be provided by hydraulic pressure, pneumatic pressure or by a stepper driver motor (not shown), all well understood to those skilled in the art. The travel of the die cavity 24 will be calibrated so as to travel the distance into the base layer 12 that will fill the die cavity 24 with thermoplastic material. Of course, a ridge 32 of thermoplastic material will develop around the die cavity 24 as it travels into the base layer 12.

Once the protrusion cavity 24 has traveled into the base layer 12 its entire travel distance, and the die cavity 24 is full of melted thermoplastic material from the base layer 12, the temperature of the heater block 26 is reduced so that the die cavity 24 is cooled and the thermoplastic material within the die cavity 24 solidifies enough to retain the internal shape of the hollow portion of the die cavity 24. Once the thermoplastic material in the die cavity 24 has solidified, the protrusion device 22 returns to its home position, and is reheated for the next molding member. Of course, a series of die cavities can be provided at desirable intervals to simultaneously provide a series of protrusions along the molding member 10, or the molding member 10 can be moved laterally to be aligned at a different location for accepting the die cavity 24.

Figure 3:
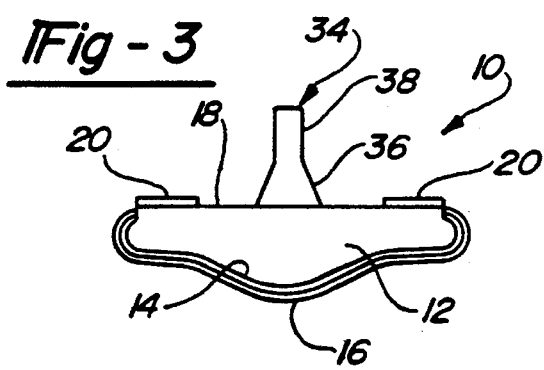
FIG. 3 is an end view of a vehicle molding member according to a preferred embodiment of the present invention.

FIG. 3 shows an end view of the molding member 10 after the protrusion device 22 has returned to its home position. As is apparent, the die cavity 24 forms a locating and fastening stud 34 integral with the base layer 12. The locating stud 34 takes on the internal shape of the die cavity 24. In the shown embodiment, the locating stud 34 has a cone-shaped base portion 36 such that the widest part of the base portion 36 is in contact with the back surface 18. The cone-shaped base portion 36 extends upward to a cylindrical upper portion 38. The cone-shaped base portion 36 provides added strength at the connection point between the stud 34 and the base layer 12 so as to increase the integrity of the stud 34 from breaking away from the base layer 12. However, it is possible to have other shaped die cavities producing other shapes of locating studs without departing from the spirit of the invention.

Figure 4:
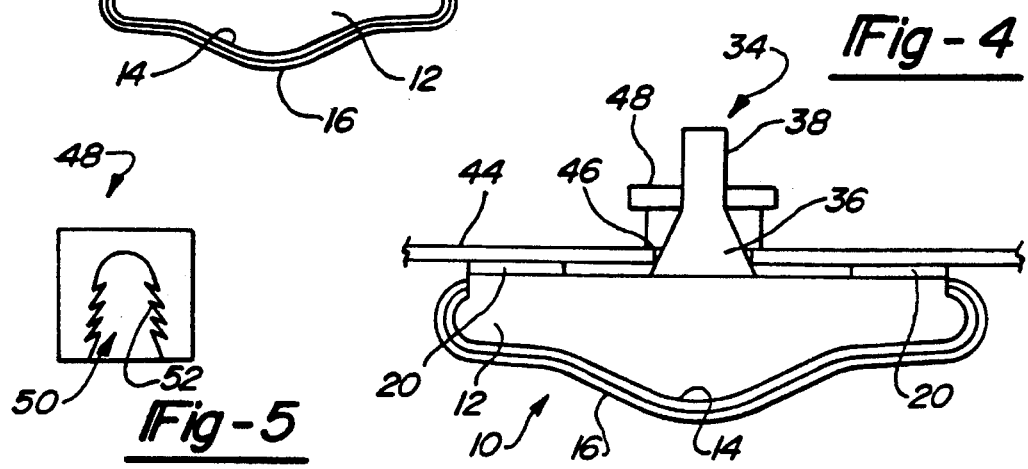
FIG. 4 is an end view of the vehicle molding member of FIG. 2 shown secured to a vehicle body part.

FIG. 4 shows an end of the molding member 10 secured to a vehicle part 44 such as a bumper or a door. The locating stud 34 extends through an opening 46 in the part 44 such that the elongated cylindrical portion 38 is on the inside of the vehicle, and the adhesive strips 20 contact the outer surface of the part 44. In this configuration, the adhesive strips 20 act to secure the molding member 10 to the vehicle part 40 such that the outer decorative layers 14 and 16 face away from the vehicle. A plastic retaining clip 48 is secured around the cylindrical portion 38 of the stud 34 flush against the inside of the vehicle part 44 in order to further help secure the molding member 10 to the vehicle part 44. An opening (see FIG. 4) is provided in the clip 48 and is formed in the appropriate shape to accept the cylindrical portion 38, as well as part of the conical portion 36 as shown.

Figure 5:
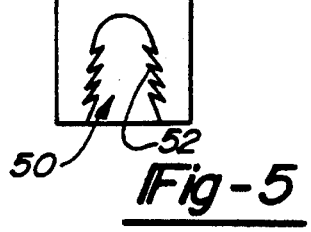
FIG. 5 is a top view of a clip for securing the vehicle body molding member to the vehicle as shown in FIG. 4.

FIG. 5 shows a top view of the clip 48. As it is apparent by this view, the clip 48 includes an opening 50 that extends through one side of the clip 48. The opening 50 includes a series of retaining spikes 52 provided integral with the sides of the opening 50, that face away from the open edge of the retaining clip 48 such that when the retaining clip 48 is inserted onto the stud 34, the spikes 52 will flex allowing the retaining clip 48 to be easily inserted. However, once the retaining clip 48 is in place on the stud 34, the spikes 52 act to retain the clip in place in a well understood manner.

The above described method of producing the locating and fastening stud 34 results in a fastening stud being an integral part of the molding member 10. Further, the locating and fastening stud 34 consists of the same material as the molding member 10 and has no weld or seam line. Therefore, this method eliminates the possibility of adhesion failure which would normally cause the molding to fall of the vehicle. Furthermore, the cost of metal or plastic locator and fastener studs and their tools to manufacture is totally eliminated. Recycling of the molding is also improved because the metal does not have to be separated from the molding.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of producing an integral protrusion, said method comprising the steps of:

providing a thermoplastic component;

providing a die cavity positioned relative to the thermoplastic component, said die cavity including a hollow region;

heating the die cavity to a temperature sufficient to melt the material of the thermoplastic component;

applying the heated die cavity to be in contact with thermoplastic component so that the thermoplastic material surrounding the heated die cavity melts and is forced into the hollow region of the die cavity;

cooling the die cavity in order to solidify the thermoplastic material within the die cavity; and removing the die cavity from the thermoplastic component such that a protrusion having the shape of the hollow region is formed integral with the thermoplastic component.

2. The method according to claim 1 wherein the step of providing a thermoplastic component includes providing a molding strip for a vehicle.

3. The method according to claim 1 wherein the step of providing the die cavity includes providing a die cavity having a lower conical portion and an upper cylindrical portion where the lower conical portion and the upper cylindrical portion each have a hollow region such that the integral protrusion has a lower conical portion and an upper cylindrical portion where the widest portion is in contact with the thermoplastic component.

4. The method according to claim 1 wherein the step of heating the die cavity includes heating the die cavity by means of a temperature controlled heater block.

5. The method according to claim 1 further comprising the step of positioning the thermoplastic component in a fixture such that the heated die cavity contacts the thermoplastic component at a desirable location.

\* \* \* \* \*